April 20, 1948.  T. L. FAWICK  2,439,849
ASSEMBLY FOR CLUTCHES AND BRAKES
Filed April 26, 1944

INVENTOR
THOMAS L. FAWICK
BY Willard D. Eakin
ATTORNEY

Patented Apr. 20, 1948

2,439,849

UNITED STATES PATENT OFFICE 2,439,849

ASSEMBLY FOR CLUTCHES AND BRAKES

Thomas L. Fawick, Akron, Ohio, assignor to The Fawick Airflex Company, Inc., a corporation of Indiana Application April 26, 1944, Serial No. 532,761

7 Claims. (Cl. 192—88)

This invention relates to assemblies suitable for use as clutches or brakes. Some subject matter disclosed in this application is more broadly claimed in my U. S. Patent No. 2,307,456, granted January 5, 1943.

Its chief objects are to provide a strong, durable and dependable structure; to provide compactness of structure and economy of construction; to provide facility of assembly and disassembly; and to provide a desirable cushioning of the torque and substantial flexible-coupling characteristics.

More specific objects are to provide for firm anchorage of a torque-sustaining member comprising rubber or the like; to provide in an improved manner for sustension of centrifugal force by a deformable, fluid-distended, actuating member; and to provide for effective cooling of frictional-engagement surfaces.

Figure 2:
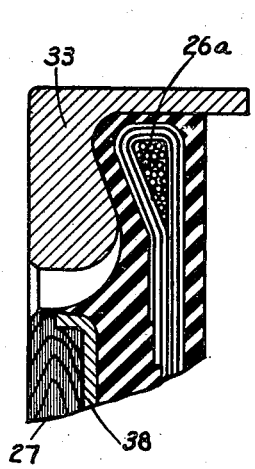
Fig. 2 is a cross-section of a bead portion of a diaphragm member, on a larger scale.
Figure 1:
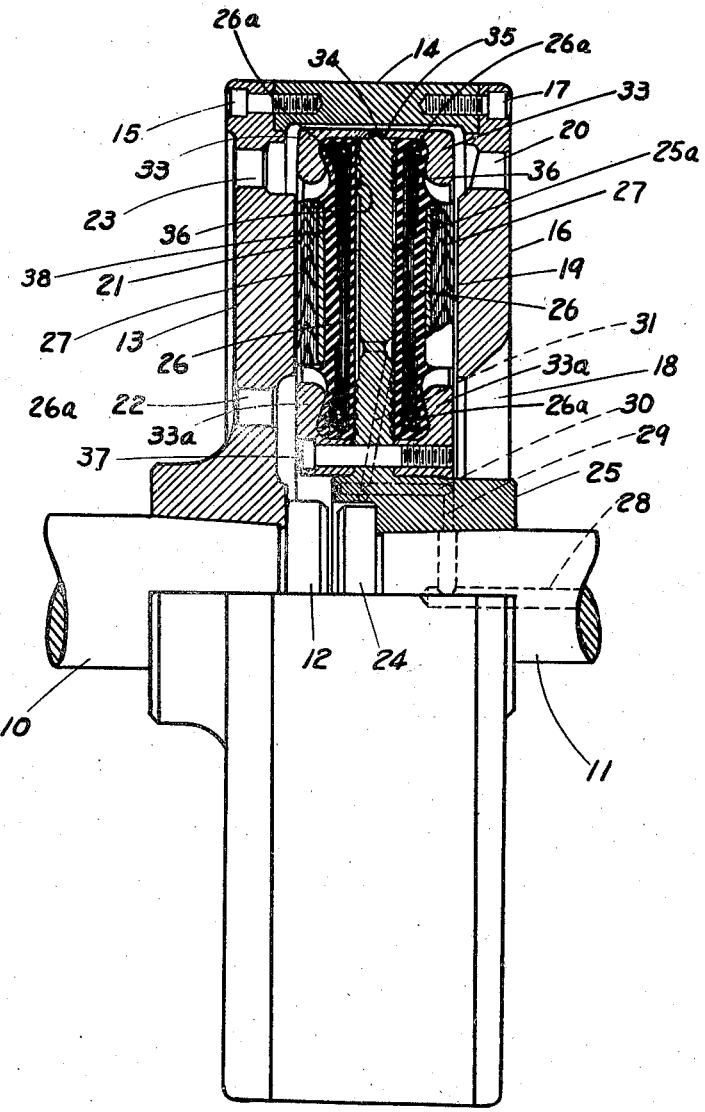
Fig. 1 is a side elevation, with the lower half in section, on the medial, axial plane, of an assembly embodying my invention in its preferred form.

Referring to the drawings, the assembly, here shown as adapted for use as a clutch, comprises a shaft 10, which can be considered as the driving shaft, and a shaft 11, substantially coaxial with it, which can be considered as the driven shaft.

On the shaft 10 is secured, by means of a retaining head 12, a bell-shaped structure comprising a disc-shaped member 13 constrained to rotate with the shaft 10, an outer peripheral annular member 14 secured to the member 13 by bolts such as the bolt 15, and an annular disc-like member 16 secured to the member 14 by bolts such as the bolt 17 and projecting radially inward to its unattached inner periphery, which is radially spaced a substantial distance from the structure that it surrounds, so that there is an annular space 18 for intake of cooling air, the member 16 being formed with a radially disposed, annular frictional-engagement face 19 and with a circumferential series of air-outlet holes, such as the hole 20, radially outward from the frictional-engagement face 19.

The member 13 is formed with a radially disposed, annular, frictional-engagement face 21 and with air-inlet holes 22 radially inward from said face and air-outlet holes 23 radially outward from said face.

Secured against relative rotation upon the shaft 11, by a retaining head 24, is a clutch-disc member 25 having a radial, plate-like portion 25ª positioned midway between the frictional-engagement faces 19 and 21 of the bell-shaped structure, and on the opposite faces of the member 25ª are mounted respective fluid-distensible diaphragms 26, 26, preferably of cord-reinforced rubber, each of which has mounted upon its axially-outer face an annular wear-shoe member 27, or a circumferential series of wear shoes, adapted for frictional-engagement with the adjacent one of the frictional-engagement faces 19, 21 of the bell-shaped structure upon fluid distension of the diaphragm members.

To provide for such fluid distension, and for venting of the fluid for disengagement of the friction faces, the shaft 11 is formed with a fluid passage 28 which leads, through passages 29, 30, 31, 32 in the member 25, to the interfaces between the member 25 and the respective diaphragms.

At their outer peripheries the diaphragms 26 are formed with beads reinforced by circumferential bead-core cords 26ª or the like and are sealed to the member 25ª by being clamped against it by respective annular clamps 33, 33 which are of L-shape in cross-section and are fixed in clamping position by an annular weld 34 while they are held abutted against a low annular flange 35 on the member 25ª, the proportions being such that in that position they firmly clamp the beads of the diaphragms.

To increase the torque-sustaining grip of the diaphragms against the member 25ª the latter preferably is formed with fields of dimples 36, 36 for the forcing of the rubber into the dimples by the clamping pressure.

The meeting faces of the diaphragms' beads and the clamps are so non-radial that the beads are pocketed, so to speak, between the clamps and the member 25ª, and this permits the application of a strong clamping pressure without substantial escape of rubber from between the two clamping members, and thus provides a very strong anchorage of the diaphragms for sustension of torque.

The construction at the inner peripheries of the diaphragm corresponds substantially to that just described with respect to their outer peripheries except that the annular clamps, 33ª, 33ª, are held in clamping position by bolts such as the bolt 37 instead of by welding because welding would be less feasible at that position.

For uniformity of pressure throughout the frictional-engagement surfaces the wear shoe members 27 can be interrupted by a series of radial cuts, as at 37, so that a circumferential series of segmental wear shoes is provided, and in that case it is desirable to make special provision for sustaining the centrifugal force of the wear shoes.

In the present embodiment this is done by interposing between the diaphragm 26 and each wear shoe 27, and securing it to both of them by vulcanized adhesion, an annular metal plate 38 formed at its outer margin with a laterally projecting marginal flange which is interlocked with the wear shoe against centrifugal force.

The structure as described provides the several advantages that are set out in the above statement of objects and various modifications are possible without sacrifice of all of such advantages and without departure from the scope of the appended claims.

I claim:

1. An assembly comprising two relatively rotatable structures so journaled as to be subject to misalignment of their axes, said structures being adapted for frictional, torque-sustaining engagement with each other, one of said structures having an annular, frictional-engagement face disposed at least approximately at right angles to the axis of rotation and the other comprising a rigid member having an annular face confronting the said frictional-engagement face, an annular diaphragm structure backed by the said annular face of the rigid member and having a portion for cushioning and sustaining the torque and for compensating for misalignment, the chief material of said portion having substantially the resilient deformability of vulcanized soft-rubber, said diaphragm structure being adapted to be distended into engagement with said frictional-engagement face, and means for conducting distending fluid to and from said diaphragm structure.

2. An assembly comprising two relatively rotatable structures so journaled as to be subject to misalignment of their axes, said structures being adapted for frictional, torque-sustaining engagement with each other, one of said structures having an annular, frictional-engagement face disposed at least approximately at right-angles to the axis of rotation and the other comprising a rigid member having an annular face confronting the said frictional-engagement face, an annular diaphragm structure backed by the said annular face of the rigid member and secured thereto at least at its inner periphery and having a portion for cushioning and sustaining the torque and for compensating for misalignment, the chief material of said portion having substantially the resilient deformability of vulcanized soft-rubber, said diaphragm structure being adapted to be distended into engagement with said frictional-engagement face, and means for conducting distending fluid to and from said diaphragm structure.

3. An assembly comprising two relatively rotatable structures so journaled as to be subject to misalignment of their axes, said structures being adapted for frictional, torque-sustaining engagement with each other, one of said structures having a pair of frictional engagement faces defining an annular space between them and the other comprising a rigid member extending into said space, diaphragm means on said rigid member adapted to be distended into engagement with the said frictional-engagement faces, and means for conducting distending fluid to and from said diaphragm means, the diaphragm means comprising a portion for cushioning and sustaining the torque and for compensating for misalignment, the chief material of said portion having substantially the resilient deformability of vulcanized soft-rubber.

4. An assembly comprising two relatively rotatable structures so journaled as to be subject to misalignment of their axes, said structures being adapted for frictional, torque-sustaining engagement with each other, one of said structures having a pair of frictional engagement faces defining an annular space between them and the other comprising a rigid member extending into said space, a pair of diaphragm structures on opposite sides of and backed by said rigid member and adapted to be distended into engagement with said frictional engagement surfaces respectively, each of said diaphragm members having a portion for cushioning and sustaining the torque and for compensating for misalignment, the chief material of said portion having substantially the resilient deformability of vulcanized soft-rubber, and means for conducting distending fluid to and from said diaphragm members.

5. An assembly comprising two relatively rotatable structures so journaled as to be subject to misalignment of their axes, said structures being adapted for frictional, torque-sustaining engagement with each other, one of said structures having a pair of frictional engagement faces defining an annular space between them and the other comprising a rigid member extending into said space, a pair of diaphragm structures on opposite sides of and backed by said rigid member and adapted to be distended into engagement with said frictional engagement surfaces respectively, each of said diaphragm members having a portion for cushioning and sustaining the torque and for compensating for misalignment, the chief material of said portion having substantially the resilient deformability of vulcanized soft-rubber, and means for conducting distending fluid to and from said diaphragm member, each of said diaphragm members comprising a sheet of material secured and sealed at its opposite margins to said rigid member and therewith defining a fluid-receiving chamber.

6. An assembly comprising two relatively rotatable structures so journaled as to be subject to misalignment of their axes, said structures being adapted for frictional, torque-sustaining engagement with each other, one of said structures having a frictional engagement face disposed at least approximately at right-angles to the axis of rotation and the other comprising a rigid member having a face confronting the said frictional-engagement face, a single-walled diaphragm structure backed by and secured and sealed to said rigid member and therewith defining a fluid-receiving chamber, said diaphragm structure being adapted to be distended into engagement with said frictional-engagement face and having a portion for cushioning and sustaining the torque and for compensating for misalignment, the chief material of said portion having substantially the resilient deformability of vulcanized soft-rubber, and means for conducting pressure fluid to and from said diaphragm structure.

7. An assembly comprising two relatively rotatable structures so journaled as to be subject to misalignment of their axes, said structures being adapted for frictional, torque-sustaining engagement with each other, one of said structures having a frictional engagement face disposed at least approximately at right-angles to the axis of rotation and the other comprising a rigid member having a face confronting the said frictional-engagement face, a single-walled diaphragm structure backed by and secured and sealed to said rigid member and therewith defining a fluid-receiving chamber, said diaphragm structure being adapted to be distended into engagement with said frictional-engagement face and having a portion for cushioning and sustaining the torque and for compensating for misalignment, the chief material of said portion having substantially the resilient deformability of vulcanized soft-rubber, and means for conducting pressure fluid to and from said diaphragm structure, the diaphragm structure being formed with a bead at its margin and the assembly including means for clamping the bead.

THOMAS L. FAWICK.

REFERENCES CITED

The following references are of record in the file of this patent:

UNITED STATES PATENTS

| Number | Name | Date |
|---|---|---|
| 427,085 | Jones | May 6, 1890 |
| 876,543 | Hanson | Jan. 14, 1908 |
| 2,017,715 | Goodyear et al. | Oct. 15, 1935 |
| 2,106,472 | Aikman | Jan. 25, 1938 |
| 2,169,639 | Grote | Aug. 15, 1939 |
| 2,185,986 | McCoy | Jan. 2, 1940 |
| 2,213,000 | Fawick | Aug. 27, 1940 |
| 2,251,445 | Fawick | Aug. 5, 1941 |
| 2,307,456 | Fawick | Jan. 5, 1943 |

FOREIGN PATENTS

| Number | Country | Date |
|---|---|---|
| 1,335 | Great Britain | Jan. 23, 1892 |
| 232,114 | Germany | Mar. 7, 1911 |